United States Patent [19]

Alderfer

[11] Patent Number: 4,795,410
[45] Date of Patent: Jan. 3, 1989

[54] EMERGENCY BELT KIT AND CONNECTOR

[76] Inventor: Earl L. Alderfer, 3629 Logan Ave., Ft. Wayne, Ind. 46803

[21] Appl. No.: 542,348

[22] Filed: Oct. 17, 1983

[51] Int. Cl.$^4$ .............................................. F16G 3/07
[52] U.S. Cl. .................................. 474/256; 24/31 C; 29/450; 138/155; 285/239; 403/280; 403/298
[58] Field of Search ..................... 474/253–258; 24/31 B, 31 C, 31 R; 29/450, 505, 525; 403/298, 280, 282, 285; 285/239; 138/155

[56] References Cited

U.S. PATENT DOCUMENTS

| | | | |
|---|---|---|---|
| 311,883 | 2/1885 | England | 24/31 C |
| 1,271,014 | 7/1918 | Bower | 474/256 X |
| 1,378,507 | 5/1921 | Wiegand | 474/256 X |
| 3,461,733 | 8/1969 | Peterson | 474/256 |
| 3,482,462 | 12/1969 | Dahlem | 474/256 X |
| 3,501,971 | 3/1970 | Peterson | 474/256 |
| 3,562,871 | 2/1971 | Peterson | 24/31 C |
| 3,605,201 | 9/1971 | Peterson | 24/31 C |
| 3,722,130 | 3/1973 | Handl | 24/31 C X |
| 3,857,294 | 12/1974 | Edouart | 474/256 |
| 3,922,759 | 12/1975 | Mabie | 474/256 X |
| 4,336,021 | 6/1982 | Haines | 474/256 |
| 4,376,631 | 3/1983 | Garza | 474/255 |

FOREIGN PATENT DOCUMENTS 570632 2/1933 Fed. Rep. of Germany .

Primary Examiner—Thuy M. Bui
Attorney, Agent, or Firm—Anthony Niewyk

[57] ABSTRACT

An emergency belt assembly is provided for temporary replacement of broken fan belts and the like. The assembly comprises a tubular belt made of an elastomeric material, and a connector having a shank with a plurality of barbs on each end portion thereof. The maximum outer transverse dimensions of the barbs on each end portion of the connector decrease from the axially outermost barb to the axially innermost barb, thereby permitting the connector to be easily inserted manually into the tubular ends of the belt. In an alternate embodiment, the connector articulates at a point intermediate its end portions to permit the connector to easily accommodate small radii turns. In yet another embodiment of the present invention, the connector has a plurality of barbs on one end thereof for frictionally engaging the inner surface of a tubular end of a line or belt, and has on its opposite end portion an attachment member, such as an eye, for attaching to a support object, such as a pole, wall, or the like.

27 Claims, 3 Drawing Sheets

EMERGENCY BELT KIT AND CONNECTOR

BACKGROUND OF THE INVENTION

This invention pertains to an emergency belt or line kit intended for temporary replacement of broken belts or lines, such as are used with various belt-pulley assemblies, or maintenance of other belts or lines, such as antenna guy lines.

Quite often, it is desirable to temporarily replace a broken belt, such as those used in certain types of belt-pulley assemblies and the like. In the past, attempts to effect these temporary replacements or reconnections of belts have included connectors having an elongate shank with a plurality of hooks axially and circumferentially disposed thereon. Connection of the ends of the belt is accomplished by inserting opposite ends of the connector into the tubular ends of the replacement belt.

Another type of prior art connector comprises a shank having threaded end portions, and which joins tubular ends of a belt or line by having the threaded end portions threadly received therein.

In order to increase the holding forces on the ends of the replacement emergency belt, connectors having multiple cutting heads have been used. This type of connector includes a shank having a plurality of, and usually two, axially spaced enlarged heads or barbs on each end thereof. The heads or barbs are of equal size, each having the same maximum outer transverse dimension, and are forcibly inserted into the tubular ends to effect the temporary replacement of a single belt, or the reconnection of ends of separate belts or lines.

Several problems or disadvantages exist with each of the above described prior art connectors. Those connectors utilizing a plurality of hooks to join the tubular ends together are undesirable when being manually inserted in that the possibility exists that the user may be cut when attempting forcibly to insert one end of the connector into a tubular end. Moreover, the manufacture of a connector having a plurality of hooks axially and circumferentially disposed thereon is not inexpensive.

Prior art connectors which have threaded end portions are generally difficult to fully insert manually into the unthreaded tubular ends of a belt or line made of an extremely hard elastomeric material. Further, such threaded connectors may tend to back-off under the influence of axially applied forces. This is particularly undesirable when such a connector is used to replace a belt in a belt-pulley assembly, since any loosening of the belt will render it ineffectual in transferring rotary motion.

A disadvantage with connectors having a plurality of enlarged heads or barbs on each end, wherein the heads or barbs are of equal size, is that it is extremely difficult, to manually insert the second and subsequent heads or barbs after the first head or barb has been inserted in a tubular end. This is because the connector can no longer be inserted into the tube with the sharp edge of the head leading as is done with the first head. Again, the problem of fully inserting this type of connector is magnified when the tubular end of the belt or line is made of an extremely hard elastomeric material. Of course, having to install the replacement belt under emergency conditions after a breakdown on the highway further compounds the difficulty of fully inserting the connector.

In addition to the above problems and disadvantages, non of , the above-described prior art connectors are particularly suitable for use in belt-pulley assemblies having at least one pulley of small radius. As that portion of the belt or line including the connector passes about the small radius pulley, the applied axial force tends to become a bending moment on the connector, thereby causing it to back-off, and possibly to eventually become disconnected from the belt.

In attempting to overcome the above problem associated with small pulleys and the like, some prior art connectors have been made of a flexible material so as to accommodate turns of small radii. Although an improvement over rigid connectors, these flexible connectors do not wear as well as those made of a rigid material, and consequently fatigue is a serious problem related to connectors made of flexible materials. Moreover, if the tubular end is made of an extremely hard material, and most are, it is extremely difficult to fully insert manually a flexible connector since it will tend to flex or bend when force is applied axially against it.

SUMMARY OF THE INVENTION

The present invention overcomes the above problems and disadvantages associated with the prior art connectors by providing an improved belt or line assembly. The belt or line assembly of the present invention does not utilize a plurality of hooks axially and circumferentially disposed thereon, thereby reducing the possibility of the user cutting himself with one of the sharp hooks when manually inserting the connector. Further, the belt or line assembly of the present invention does not have threaded end portions threadedly receivable in the tubular ends of the belt of line, and therefore eliminates the type of backing-off associated with this type of threaded connector.

As was earlier mentioned above, some prior art connectors comprise a shank having a pair of identical enlarged heads or barbs on each end thereof. The primary disadvantage with this type of connector is that after the axially outermost head has been inserted into the tubular end, it is extremely difficult, if not impossible, to fully insert manually the axially innermost barb, particularly if the belt or line is made of a very hard elastomeric material. Although the axially outermost barb may be easily inserted manually because the sharp edge can be inserted first and the connector then twisted into place, insertion of the axially innermost barb is difficult because it must be pushed straight in. The disadvantage with this type of prior art connector is eliminated by the belt or line assembly of the present invention which provides a shank having a plurality of axially spaced barbs or heads on each end thereof, and wherein each barb is smaller in maximum outer transverse dimensions than its adjacent axially outermost barb on a respective end portion of the shank. Because of the decreasing maximum outer transverse dimensions from the axially outermost barb to the axially innermost barb on each end portion, it is much easier to manually insert the connector of the present invention into the tubular end of a belt or line made of an extremely hard elastomeric material by pushing the subsequent barbs into the tube.

Moreover, the belt assembly of the present invention provides a connector that articulates at a point intermediate its end portions to permit the connector to easily accommodate the sharp turns associated with small radii pulleys and the like. By articulating as it passes about a small radius pulley or the like, the connector of the present invention will not tend to back-off as with the above prior art connectors, and since it is made of a hard material, such as brass, it has a longer useful life than the prior art flexible connectors. Further, the barbs of the connector of the present invention are harder and sharper than are the barbs of the prior art connector made of a flexible material, and therefore bite or grip the tubular end portion with greater gripping force.

The situations described above in which the connector of the present invention is used are concerned primarily with continuous belts assemblies, such as a vehicle fan belt assembly. However, the belt or line assembly of the present invention also contemplates securely coupling the ends of a non-continuous belt or belts, for example, an end of a first belt or line coupled to the end of a second belt or line. Examples of such non-continuous belts or lines are high-strength tubular fishing lines, antenna guy lines which are tubular or have tubular ends, and the like. Further contemplated by the belt or line assembly of the present invention is coupling the end of a belt or line to a supporting object, such as a pole, wall, or the like. In the latter case, one end of the connector is provided with an attachment member, such as a hook or eye.

In one form of the present invention there is provided a continuous belt assembly comprising a belt having a pair of tubular ends made of an elastomeric material, and a connector comprising an elongate rigid shank having opposite end portions. A plurality of barbs are circumferentially disposed on the end portions in an axially spaced-apart manner. The outer maximum transverse dimension of any one barb is greater than the respective inner diameters of the tubular ends, and the outer maximum transverse dimensions of the barbs on each end portion decrease in dimension from the axially outermost barb to the axially innermost barb. Each end portion is forcibly inserted into a tubular end of the belt so that the barbs frictionally engage the inner surfaces of the tubular ends, thereby securely coupling the ends of the belt together.

In another form of the present invention there is provided a connector adapted to securely couple together elastomeric tubular ends of a belt or lines, and comprises an elongate rigid shank having opposite end portions with a pair of barbs on each end portion thereof. The barbs are axially spaced-apart and each tapers radially inwardly and axially outwardly toward the remote end of its respective end portion. The axially outermost barbs have greater maximum outer transverse dimensions than respective axially innermost barbs, thereby adapting the end portions of the shank to be easily inserted manually into the tubular ends of the belt or lines.

In yet another form of the present invention there is provided a continuous belt assembly comprising a belt having a pair of tubular ends made of an elastomeric material, and a connector having a shank with opposite end portions. The connector articulates at a point intermediate the end portions, and each end portion has a barb disposed thereon. The barbs have maximum outer transverse dimensions greater than the inner diameters of the tubular ends so that when the end portions are inserted in the tubular ends, the barbs frictionally engage the inner surfaces thereof.

In still another form of the present invention there is provided a coupling assembly comprising a tubular end of a line or belt, and a connector having an elongate rigid shank with opposite end portions. A barb having a maximum outer dimension greater than the inner diameter of the tubular end is disposed on one of the end portions, and when that end portion is inserted in the tubular end, the barb frictionally engages the inner surface thereof. The opposite end portion has disposed thereon an attachment member adapted to be securely attached to an object, such as a pole, wall, or the like, thereby securely coupling the line tubular end to the object.

It is an object of the present invention to provide an improved belt or line assembly comprising a connector which is easily inserted manually into the tubular ends of a belt or line made of an elastomeric material.

Another object of the present invention is to provide a belt or line assembly comprising a shank having a plurality of barbs on each end thereof, wherein the maximum outer transverse dimensions of the barbs decrease from the axially outermost barb to the axially innermost barb on each end.

Yet another object of the present invention is to provide an improved belt or line assembly comprising a connector which articulates intermediate its end portions to accommodate travel about small radii pulleys and the like.

A further object of the present invention is to provide a belt or line assembly for securely coupling the end of a belt or line to an object, such as a pole, wall, or the like.

BRIEF DESCRIPTION OF THE DRAWINGS

The above mentioned and other features and objects of this invention, and the manner of attaining them, will become more apparent and the invention itself will be better understood by reference to the following detailed description of the invention taken in conjunction with accompanying drawings, wherein.

DETAILED DESCRIPTION

Figure 1:
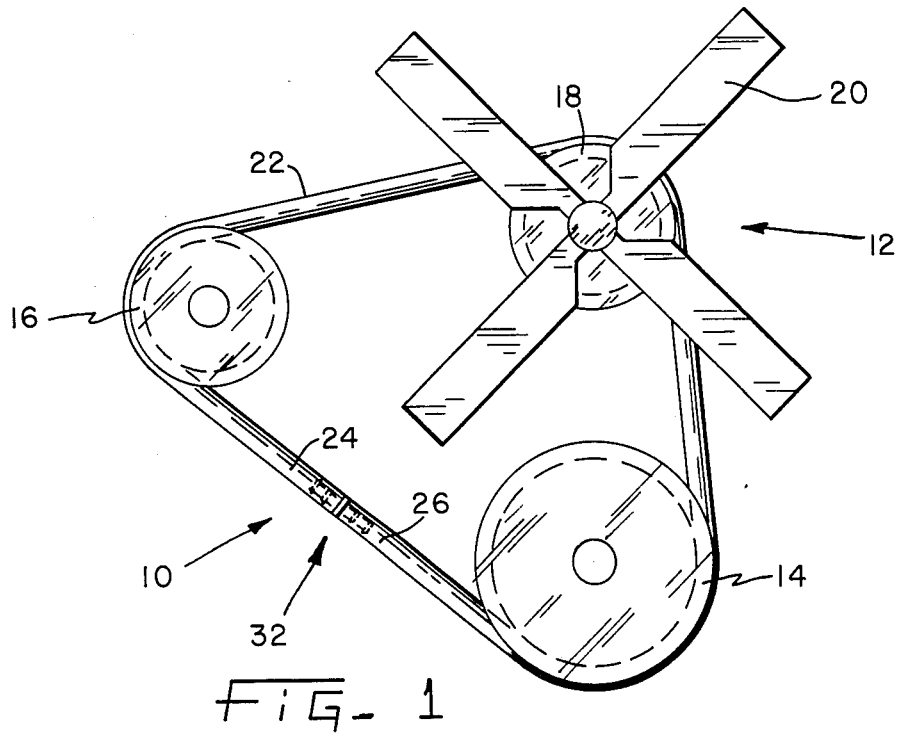
FIG. 1 is a front elevational view of a fan belt assembly incorporating on embodiment of the present invention.
Figure 6:
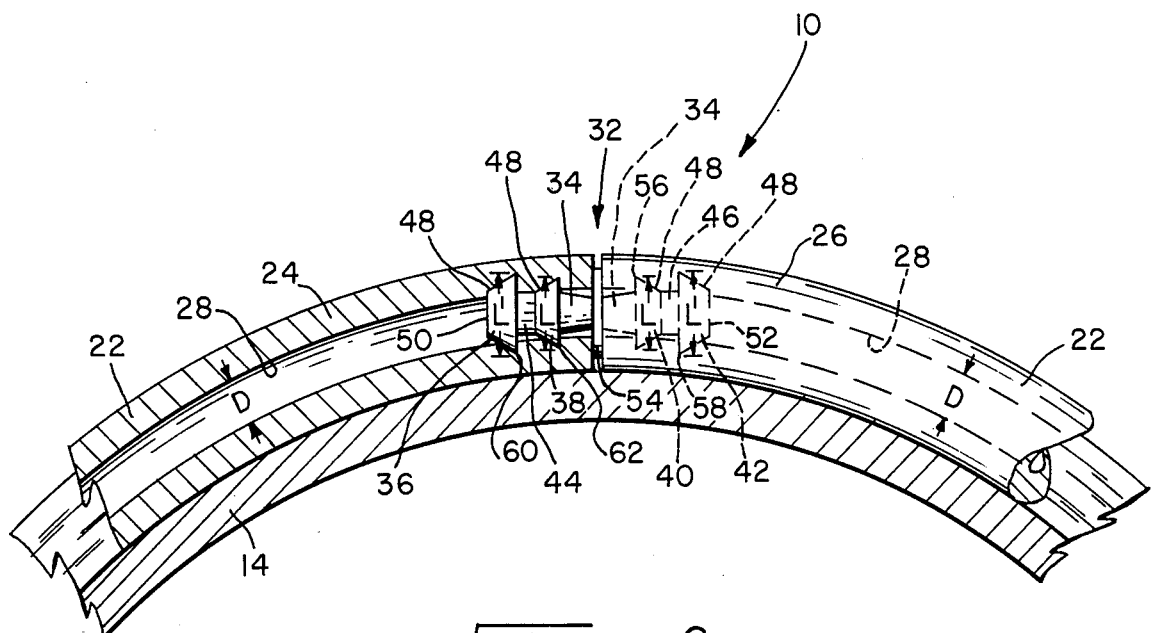
FIG. 6 is a broken-away elevational view illustrating the embodiment of FIG. 1 traveling about a curved surface.

Referring to FIGS. 1 and 6, belt assembly 10 of the present invention is illustrated in conjunction with fan belt assembly 12 comprising drive pulley 14, pulley 16, and pulley 18 operating fan 20.

Belt assembly 10 comprises tubular belt 22 having tubular ends 24, 26 with respective inner surfaces 28, 30, and connector 32 comprising shank 34 with a plurality of barbs or heads 36, 38, 40, 42 disposed on end portions 44, 46. Specifically, barbs 36, 38 are disposed on end portion 44, and barbs 40, 42 are disposed on end portion 46. The axially outermost barbs 36, 42 have maximum outer transverse dimensions L' greater than the maximum outer transverse dimensions L of axially innermost barbs 38, 40. Further, transverse dimensions L and L' are greater than diameter D of tubular belt 22.

As can be seen, each barb 36, 38, 40, 42 is preferably frusto-conical in shape having an outer surface 48 tapering radially inwardly and axially outwardly toward a respective remote end 50, 52 of shank 34. Each outer surface 48 is angularly inclined between about 30° to about 50° relative to the longitudinal axis of shank 34.

As was earlier mentioned, transverse dimensions L' of barbs 36, 42 are greater than the transverse dimensions L of barbs 38, 40, and the preferred range of measured difference between dimension L' and dimension L is between about ten-thousandths of an inch and about fifteen-thousandths of an inch. Shank 34 also includes an annular flange 54 disposed thereon midway between remote ends 50, 52.

Figure 2:
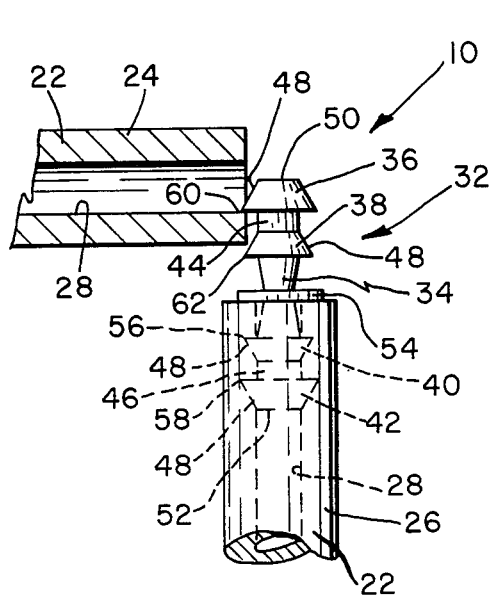
FIG. 2 is a broken-away elevational view illustrating an initial step in coupling together the embodiment of FIG. 1.
Figure 3:
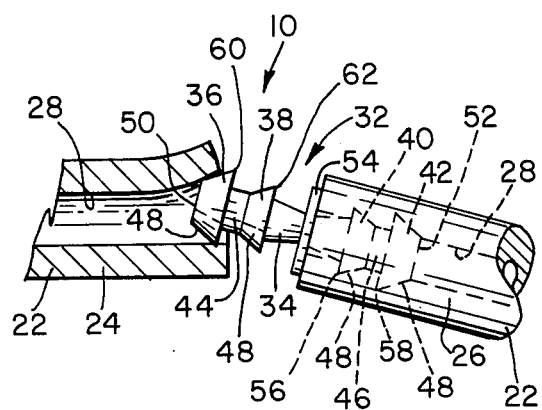
FIG. 3 is a broken-away elevational view illustrating a subsequent step in coupling together the embodiment of FIG. 1.
Figure 4:
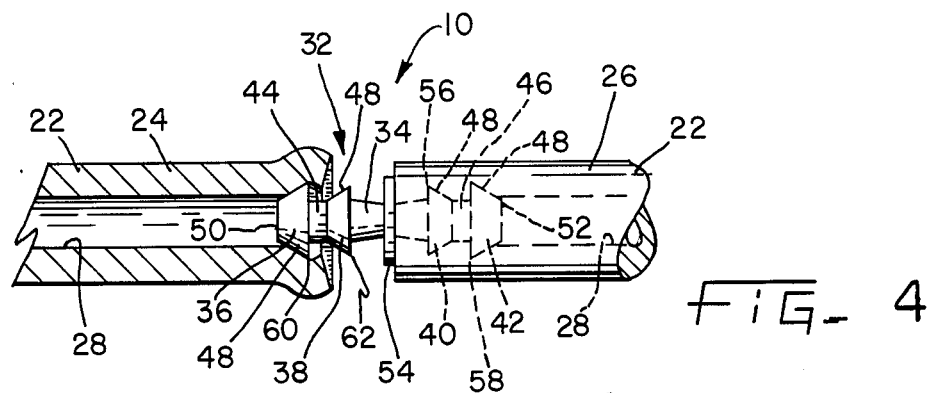
FIG. 4 is a broken-away elevational view illustrating a further subsequent step in coupling together the embodiment of FIG. 1.
Figure 5:
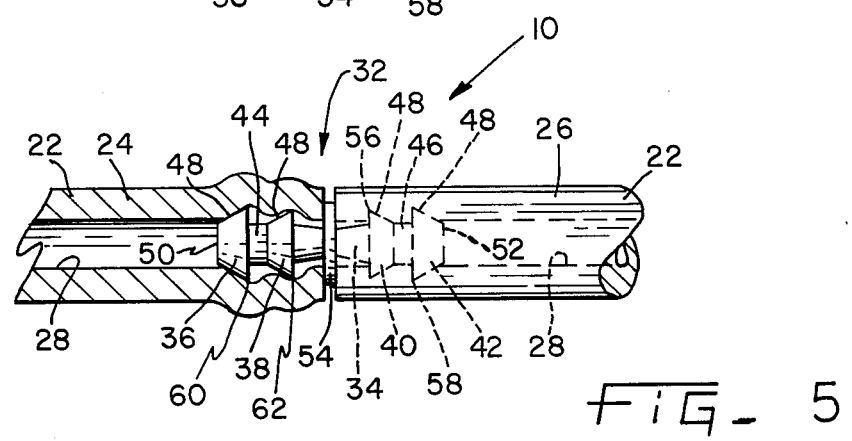
FIG. 5 is a broken-away elevational view illustrating the embodiment of FIG. 1 coupled together.

Referring now to FIGS. 2, 3, 4, 5, belt assembly 10 will generally be provided with end portion 46 of shank 34 securely inserted in tubular end 26 with the sharp peripheral edges 56, 58 of barbs 40, 42, respectively, biting or cutting into inner surface 30 as illustrated in FIG. 2. As illustrated, flange 54 abuts against tubular end 26. The user will remove the broken fan belt (not shown) and position tubular belt 22, which is made of an extremely hard elastomeric material, about pulleys 14, 16, and 18. FIG. 2 illustrates the first step in inserting end portion 44 into tubular end 24 and comprises disposing shank 34 perpendicular to the longitudinal axis of tubular end 24 with peripheral edge 60 of barb 36 seated within tubular end 24 and against inner surface 28. The user then pivots tubular end 26 and shank 34 upwardly until outer surface 48 of barb 36 begins to wedge itself into tubular end 24 as illustrated in FIG. 3. The completion of this initial step of inserting shank 34 is illustrated in FIG. 4 wherein barb 36 has been fully inserted within tubular end 24 with barb 38 still outside tubular end 24. The user then applies an axial force to fully seat barbs 36, 38 into tubular end 24 until it abuts flange 54. Because the maximum outer transverse dimension L of barb 38 is less than the maximum outer transverse dimension L' of barb 36, the step of fully inserting barb 38, as illustrated in FIGS. 4 and 5, is easily and manually accomplished. With prior art connectors, this subsequent step of axially pushing the second barbs into place would be extremely difficult because the tubular ends tend to neck down as shown in FIG. 4. The reduced diameters of the second barbs 36,38 makes insertion much easier to accomplish, yet does not markedly reduce the holding force of the connector.

Although FIG. 5 illustrates complete insertion of shank 34 within tubular ends 24, 26, it should be noted that peripheral edges 56, 58, 60 and 62 of respective barbs 40, 42, 36 and 38 do not yet fully cut or bite into inner surface 28 of belt 22. However, upon operation of fan belt assembly 12 with belt assembly 10 incorporated therein, the axial and radial forces applied to belt 22 will cause it to slightly stretch or neck-down to thereby cause peripheral edges 60, 62 to cut or bite into inner surface 28 as illustrated in FIG. 6. Although barbs 38, 40 are smaller in transverse dimension than barbs 36, 42, it should be noted that barbs 38, 40 still cut or bite into inner surface 28, thereby providing additional gripping or coupling action to barbs 36, 42.

The invention contemplates additional barbs on respective end portions 44, 46 which may become necessary for larger belt assemblies having pulleys of three inches or more in diameter. For example, three barbs can be disposed on each end portion 44, 46, wherein on any one of the end portions 44, 46, the axially innermost barb of a pair of barbs is smaller in transverse dimension than the axially outermost barb of the pair.

Figure 7:
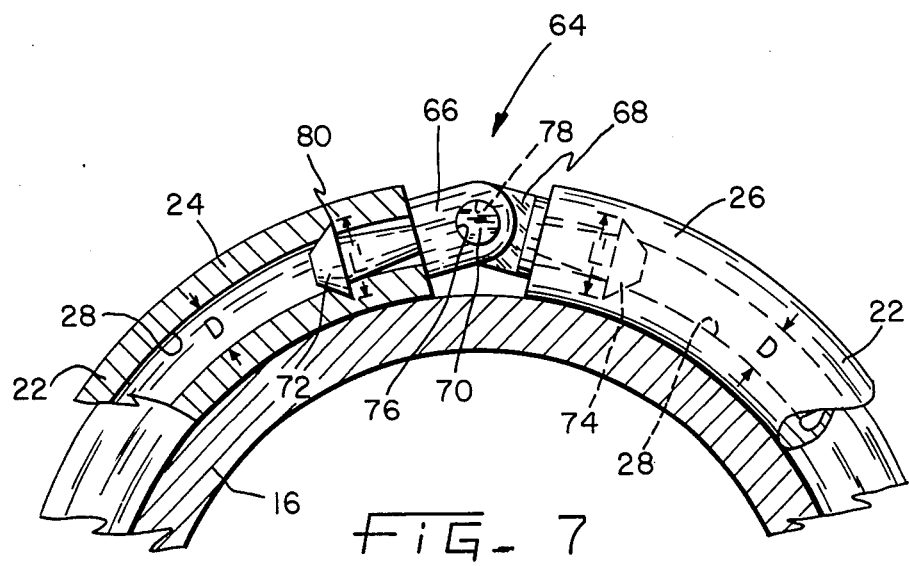
FIG. 7 is a broken-away elevational view of a second embodiment of the present invention.

Referring to FIG. 7, a second embodiment of the present invention is illustrated wherein connector 64 comprises shank segment 66 and shank segment 68 pivotally connected at their proximate ends by pin or rivet 70. Each segment 66, 68 has a respective barb 72, 74 disposed thereon, and barbs 72, 74 have maximum outer transverse dimensions L' greater than the inner diameter D of belt 22. Further, the proximate end of segment 66 is preferably U-shaped and segment 68 is receive within segment 66 to align their respective openings 76, 78 for insertion of pin or rivet 70. Connector 64 is designed so that segments 66, 68 articulate relative to each other. Connector 64 is particularly desirable for use with belt assemblies utilizing pulley of one half inch or less in diameter.

Assembly of connector 64 is similar to that of connector 32 in that one of the shank segments 66, 68 will be preinserted into its respective tubular end 24, 26, and the user will then insert the other segment as earlier described. While inserting connector 64 in tubular belt 22, should connector 64 become rotated such that it does not articulate in the plane formed by belt 22, connector 64 will rotate to properly align the articulating action with the plane of belt 22 upon application of axial and radial forces, such as those applied when belt 22 travels about pulley 16.

Again, upon application of an axial force, peripheral edge 80 of barb 72 will cut or bite into inner surface 28 of belt 22, thereby preventing any backing-off of tubular ends 24, 26 from connector 64 under normal operating conditions.

The invention also contemplates other types of pivoting or articulating connections between the proximate ends of segments 66, 68, such as a ball and socket arrangement and the like.

Figure 8:
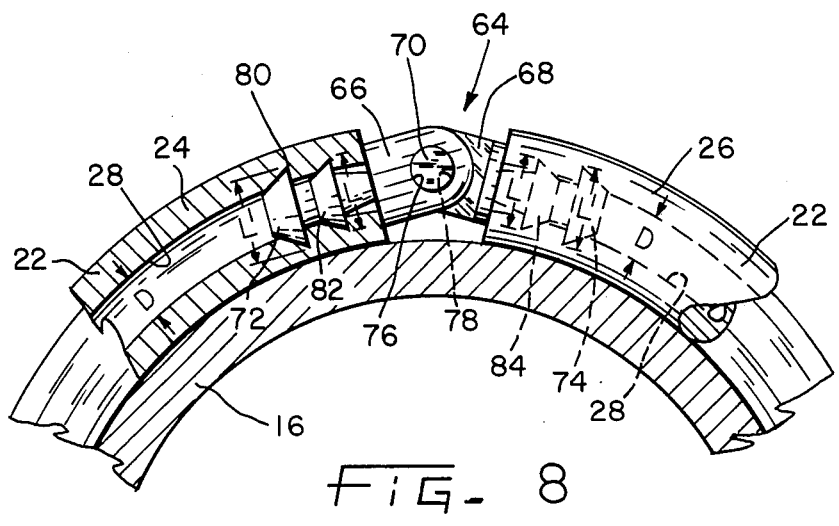
FIG. 8 is a broken-away elevational view of a modification of the embodiment in FIG. 7.

Referring to FIG. 8, a modification of connector 64 has been made by adding additional barbs 82, 84 axially inwardly of respective barbs 72, 74, but greater than dimension D of belt 22. Barbs 82, 84, have maximum outer transverse dimensions L less than transverse dimension L' of barbs 72, 74. Modified connector 64 illustrated in FIG. 8 could naturally be used when the applied axial and radial forces are extremely high or with pulleys having diameters greater than one-half inch.

Figure 9:
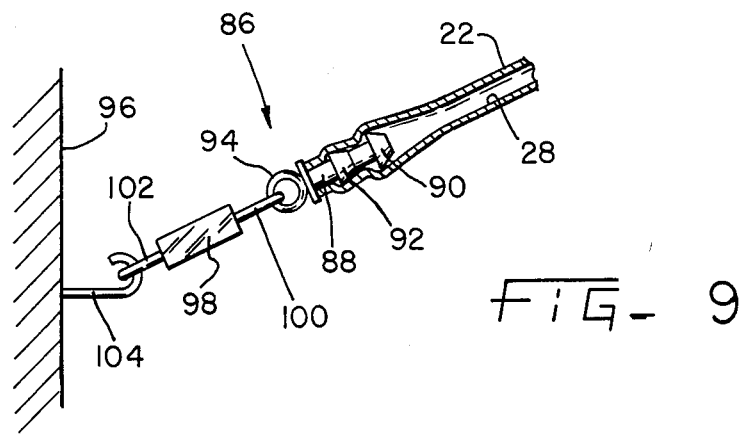
FIG. 9 is a broken-away elevational view of a third embodiment of the present invention.

FIG. 9 illustrates a third embodiment of the present invention comprising connector 86 having a shank 88 with barbs 90, 92 on one end thereof and an attachment member, such as eye 94 on the other end thereof. Again, barb 90 is greater in maximum outer transverse dimension than barb 92, and connector 86 is generally preinserted in tubular belt 22. Connector 86 is particularly advantageous in joining an end of a line or belt 22 to a support object such as pole 96. In one particular example, tubular end 22 represents the end of an antenna wire requiring a secure connection to pole 96. By utilizing connector 86 of the present invention, an insulated member, such as ceramic connector 98 having looped ends 100, 102, maybe used to interconnect eye 94 of connector 86 with hook 104 secured to pole 96.

Although the above barbs are described as having frustoconical shapes, it should be realized that their transverse cross sections can have any geometric shape, for example, circular, oval, square, and the like. Regardless of the geometric shape, it is important that the maximum outer transverse dimension of each barb is greater than the inner diameter of the tubular belt 22 used. Further, each connector in the above described embodiment is made of a hard material, such as brass, steel, or aluminum, however, brass is the preferred material.

It should also be appreciated that tubular belt 22 may be of any size in length and diameter, and that the various connectors can be manufactured in any desired size appropriate to the dimensions of the desired tube. Moreover, although the tubular ends 24, 26 are of equal inner diameter, it is contemplated that tubular end 24 could be smaller or larger in inner diameter than tubular end 26, and that connector 32 can be manufactured with different sized barbs to accommodate the difference in size between tubular ends 24, 26.

Given in the following are dimensions and specifications of a typical working embodiment of this invention, and which are exemplary only and not limitative of the invention. The scope of the invention is given in the appended claims:

inner diameter D, of tube 22: 0.155"
outer diameter of tube 22 angular inclination of barb outer surface 48: 0.365"
L': 0.260"
difference between L' and L 0.010"
elastomeric material of tube 22: polyurethane The polyurethane of which tube 22 is preferably made can be purchased from the BF Goodrich Company of Cleveland, Ohio under the tradename Estane. This particular polyurethane has the following typical physical characteristics:

Specific gravity: 1.20
Hardness, Durometer: 85±3
Tensile Strength, psi: 6500
Ultimate elongation: 550%
Modulus at 300%, psi: 1500
Graves Tear, Pounds/inch: 500
Vicat softening point: 85° C.
Tensile after four weeks in water at 70° C., psi: loss 65%
Tensile after eight weeks in water at 70° C., psi: loss 99%
Fadeometer-Reflectance after exposure of 0, 40, and 100 hours respectively: 65,62,51

While this invention has been described as having preferred embodiments, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. A continuous belt assembly comprising:
   a belt having a pair of tubular ends made of an elastomeric material,
   a connector member comprising an elongate rigid body member having opposite end portions, and
   a plurality of individual rigid barb members circumferentially disposed on said end portions, said barb members being separate and axially spaced-apart on their respective said end portions and having respective maximum outer transverse dimensions greater than respective inner diameters of said tubular ends, the respective maximum outer transverse dimensions of said barb members on each said end portion decreasing in dimension from axially outermost one of said barb members to the axially innermost one of said barb members to facilitate insertion of said end portions into respective said tubular ends,
   each said end portion being forcibly received into a respective said tubular end with said barb members frictionally engaging the inner surfaces of said tubular ends, thereby securely coupling said tubular ends together.

2. The assembly of claim 1 wherein each said barb member tapers radially inwardly and axially outwardly from its respective maximum outer transverse dimension towards the remote end of its respective said end portion, thereby further facilitating the receiving of said end portions into respective said tubular ends.

3. The assembly of claim 2 wherein said member articulates at a point intermediate said end portions to permit said belt to accommodate small radii turns.

4. The assembly of claim 2 wherein said connector member further comprises an annular flange member disposed on said body member midway between said end portions, the remote ends of said tubular ends abutting against said flange member to insure the proper insertion of said end portions into said respective said tubular ends.

5. The assembly of claim 1 wherein said barb members are frusto-conical in shape and taper radially inwardly and axially outwardly toward the remote ends of their respective said end portions.

6. The assembly of claim 5 wherein said elastomeric material is polyurethane.

7. The assembly of claim 5 wherein the tapering outer surfaces of said frusto-conical barb members are angularly disposed relative to the longitudinal axis of said body member between about 30° and about 50°.

8. The assembly of claim 7 wherein the measured difference between the respective maximum outer transverse dimensions of adjacent pairs of said barb members on each said end portion is between about ten-thousandths to about fifteen-thousandths of an inch.

9. The assembly of claim 8 wherein said elastomeric material is polyurethane.

10. The assembly of claim 9 wherein said connector member further comprises an annular flange member disposed on said body member midway between said end portions.

11. The assembly of claim 10 wherein said connector member and said barb members are made of brass.

12. A connector adapted to securely couple together a pair of elastomeric tubular ends of a line or lines, such as fan belts, fishing lines, and the like, comprising:
   an elongate rigid body member having opposite end portions, and
   a pair of individual rigid barb members on each said end portion, said barb members of each pair being separate and axially spaced-apart and tapering radially inwardly and axially outwardly toward the remote ends of the respective said end portions, the axially outermost said barb member of each said pair having a greater maximum outer transverse dimension that the respective axially innermost said barb member, whereby said end portions are adapted to be forcibly inserted into the tubular ends with said barb members frictionally engaging the inner surfaces thereof.

13. The connector of claim 12 wherein each axially outermost barb member of each pair is greater in transverse dimension than its respective said axially innermost barb member by about ten-thousandths to about fifteen-thousandths of an inch.

14. The connector of claim 12 wherein the tapering outer surfaces of said barb members are angularly disposed by about 30° to about 50° relative to the longitudinal axis of said body member.

15. The connector of claim 12 wherein said body member includes an annular flange member disposed thereon midway between said end portions.

16. The connector of claim 12 wherein said body member articulates at a point intermediate said end portions.

17. The connector of claim 12 wherein the difference between the maximum outer transverse dimensions of said axially outermost barb members and said axially innermost barb member is between about ten-thousandths to about fifteen-thousandths of an inch, and wherein the tapering outer surfaces of said barb members are angularly disposed about 30° to about 50° relative to the longitudinal axis of said body member.

18. A belt assembly comprising:
a belt having a pair of tubular ends made of an elastomeric material,
a connector having an elongate rigid body member with opposite end portions, and
a pair of separate, axially spaced rigid barb members on each said end portion, said barb members being frusto-conical in shape with generally circular transverse cross sections and tapering radially inwardly and axially outwardly toward the remote ends of their respective said end portions,
the axially outermost said barb members having greater maximum outer diameters than the respective axially innermost barb members, said axially innermost barb members having maximum outer diameters greater than the respective inner diameters of said tubular ends,
said end portions being disposed in respective said tubular ends with said barb members frictionally engaging the inner surfaces of said tubular ends, thereby securely connecting said tubular ends together.

19. The assembly of claim 18 wherein the maximum outer diameters of said axially outermost barb members are greater than the maximum outer diameters of said axially innermost barb members by about ten-thousandths to about fifteen-thousandths of an inch.

20. The assembly of claim 19 wherein the tapering outer surfaces of said barb members are angularly disposed about 30° to about 50° relative to the longitudinal axis of said body member.

21. The assembly of claim 20 wherein said elastomeric material is polyurethane.

22. The assembly of claim 21 wherein said body member includes an annular flange member midway between said end portions.

23. The assembly of claim 21 wherein said body member articulates at a point intermediate said end portions.

24. The assembly of claim 21 wherein said connector and said barb members are made of brass.

25. A continuous belt assembly comprising: a belt having a pair of tubular ends made of an elastomeric material;
a connector including first and second elongate rigid body member with respective opposite end portion, said body members being pivotably connected together at a point intermediate said end portions such that said end portions face outwardly from each other;
a plurality of individual rigid barb members circumferentially disposed on said end portions, said barb members being separate and axially spaced apart on their respective said end portions and having respective maximum outward transverse dimensions greater than respective inner diameters of said tubular ends, the respective maximum outer transverse dimensions of said barb members on each said end portion decreasing in dimension from the axially outermost one of said barb members to the axially innermost one of said barb members to facilitate insertion of said end portions into respective said tubular ends; and
said end portions being disposed in respective said tubular ends with said barb members frictionally engaging the inner surfaces of said tubular ends to securely join said tubular ends together, whereby, when said belt runs about small radii objects, said connector can articulate to prevent said belt from parting at the juncture of said tubular ends.

26. The assembly of claim 25 wherein said elastomeric material is polyurethane.

27. A continuous belt assembly comprising:
a belt made of an elastomeric material and having first and second tubular end,
a connector member connected to the first tubular end and having a barbed end portion extending out of said first tubular end, said barbed end portion comprising two rigid barb members circumferentially disposed on said end portion, said barb members being separate and axially spaced apart and having maximum outer transverse dimensions greater than the inner diameter of the second tubular end of said belt, the respective maximum outer transverse dimensions of said barb members decreasing in dimension from the axially outermost barb member to the axially innermost barb member to facilitate insertion of said barb members into said second tubular end,
said end portion of said connector being forcibly received into said second end of said belt with said barb members frictionally engaging the inner surface of the second tubular end, thereby securely coupling the ends of the belt together.

* * * * *